US012463368B2

(12) United States Patent
Imfeld et al.

(10) Patent No.: US 12,463,368 B2
(45) Date of Patent: Nov. 4, 2025

(54) ELECTRICAL CONNECTION FOR AN ACTUATOR UNIT

(71) Applicant: MAXON INTERNATIONAL AG, Sachseln (CH)

(72) Inventors: Matthias Imfeld, Giswil (CH); Remo Schrackmann, Sarnen (CH); Pius Odermatt, Dallenwil (CH); Patrik Omlin, Sarnen (CH)

(73) Assignee: MAXON INTERNATIONAL AG, Sachseln (CH)

( * ) Notice: Subject to any disclaimer, the term of this patent is extended or adjusted under 35 U.S.C. 154(b) by 349 days.

(21) Appl. No.: 18/004,506

(22) PCT Filed: Jun. 15, 2021

(86) PCT No.: PCT/EP2021/066068
§ 371 (c)(1),
(2) Date: Jan. 6, 2023

(87) PCT Pub. No.: WO2022/008178
PCT Pub. Date: Jan. 13, 2022

(65) Prior Publication Data
US 2023/0253726 A1  Aug. 10, 2023

(30) Foreign Application Priority Data
Jul. 7, 2020 (EP) .................................. 20184498

(51) Int. Cl.
*H01R 13/40* (2006.01)
*A61M 60/878* (2021.01)
(Continued)

(52) U.S. Cl.
CPC ......... *H01R 13/405* (2013.01); *A61M 60/878* (2021.01); *A61N 1/3752* (2013.01); *H01R 13/5208* (2013.01); *H01R 13/5216* (2013.01)

(58) Field of Classification Search
CPC .................................................... H01R 13/405
(Continued)

(56) References Cited

U.S. PATENT DOCUMENTS

| 3,643,208 A * | 2/1972 | Massa, Jr. ............ | H01R 13/523 |
| | | | 439/387 |
| 4,433,206 A * | 2/1984 | Lewis ................ | H01R 13/6592 |
| | | | 174/76 |

(Continued)

FOREIGN PATENT DOCUMENTS

| DE | 102018208539 A1 | 12/2019 |
| EP | 2787581 A1 | 10/2014 |

OTHER PUBLICATIONS

International Search Report (PCT/ISA/210) with English translation and Written Opinion (PCT/ISA/237) mailed on Oct. 8, 2021, by the European Patent Office as the International Searching Authority for International Application No. PCT/EP2021/066068.

*Primary Examiner* — Phuong K Dinh
(74) *Attorney, Agent, or Firm* — Buchanan Ingersoll & Rooney PC

(57) ABSTRACT

An implantable connection cable assembly for an actuator unit of an implant, and related manufacturing method, involve a plug connector and a cable strand which ends in the plug connector and has at least two connection cables. The plug connector has a plug housing and at least two contact elements each connected to a connection cable, wherein the contact elements are fixed in the plug housing. The contact elements of the plug connector can each have a cable receptacle for electrical connection to the connection cable of the cable strand and a separate connection interface for electrical connection to the drive assembly of the actuator unit, wherein the cavities between the plug housing, the contact elements and the cable strand are filled with a potting compound.

18 Claims, 5 Drawing Sheets

(51) Int. Cl.
*A61N 1/375* (2006.01)
*H01R 13/405* (2006.01)
*H01R 13/52* (2006.01)

(58) Field of Classification Search
USPC ............... 439/589, 587, 936, 606, 327, 387
See application file for complete search history.

(56) References Cited

U.S. PATENT DOCUMENTS

| | | |
|---|---|---|
| 7,217,157 B2 * | 5/2007 | Onoda ............... H01R 13/5216 |
| | | 439/589 |
| 11,114,791 B1 * | 9/2021 | Lee ....................... H01R 43/24 |
| 2013/0190551 A1 | 7/2013 | Callaway et al. |
| 2014/0235930 A1 | 8/2014 | Callaway et al. |
| 2015/0364861 A1 | 12/2015 | Lucke et al. |
| 2016/0030652 A1 | 2/2016 | Arndt et al. |

* cited by examiner

ELECTRICAL CONNECTION FOR AN ACTUATOR UNIT

CROSS-REFERENCE TO RELATED APPLICATIONS

The present application is the U.S. national stage application under 35 U.S.C. § 371 for International Patent Application No. PCT/EP2021/066068, filed on Jun. 15, 2021, which claims priority to EP 20184498.2, which was filed on Jul. 7, 2020, the entire contents of each being incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The invention relates to an implantable connection cable assembly for an actuator unit of an implant comprising a plug connector and a cable strand which ends in the plug connector and has at least two connection cables, wherein the plug connector has a plug housing and at least two contact elements, each connected to a connection cable, which are fixed in the plug housing. Furthermore, the invention relates to the actuator unit of an implant comprising a drive assembly with an electric motor and such an implantable connection cable assembly, as well as a method for manufacturing an actuator unit of an implant.

Description of Related Art

In recent years, implantable medical devices that are electrically powered and operated have become ubiquitous in the field of medicine. There is a relatively wide range of such medical devices, from neurostimulation devices, pacemakers and cochlear implants, implants for incontinence or appetite control, to cardiac assist pumps and other ventricular assist devices. Typically, such medical devices require the transmission of data, power and/or control signals via appropriate connection cables and leads from a power source or a controller to the implanted device. The different implantable device types have different requirements for the supply of electrical energy or control signals as well as different areas of application and use, so that connection cables and connectors are usually only suitable for one device type. While neurostimulation devices require an implanted connection lead that is electrically connected to a head of an implanted pulse generator, ventricular assist devices and other cardiac support systems in particular require an electrical power supply with relatively high current and voltage requirements. Accordingly, connection systems and connection cables for implanted devices are usually not usable for other implanted medical devices.

Compared to pacemakers, which typically have low or intermittent power demands, ventricular assist devices such as ventricular assist pumps have increased power demands with high current levels and high continuous voltages. Since a power failure in a cardiac assist pump can have life-threatening consequences, both the plug connector and the associated cable strand must ensure a reliable electrical connection over a long period of time to ensure continuous operation of the implanted device. As the implantation of electrical plug connectors for higher power requirements is associated with a high risk due to the cyclic loads caused by the bending and movement of the cable strand, plug connector and actuator unit in the body, such devices are supplied with power via a cable strand that is directly connected to the motor of the implanted cardiac assist pump. The connection of the cable strand to a power supply can then be made outside the body or at least at a location away from the heart that is more easily accessible and can be kept more stable.

Another challenge with implanted plug connectors, such as incontinence occlusion systems in particular, or appetite control systems placed in the stomach or digestive tract, is that the fluid-filled environment in the human body can be corrosive to the materials used in the plug connector, such as copper and stainless steel, which are conventionally used in high-performance plug connectors. In contrast, non-corrosive metal alloys, for example a platinum-iridium alloy, have problematic mechanical properties, for example high brittleness, which make processing and use in an implanted actuator unit and connection of a cable strand difficult. Moreover, such non-corroding metal alloys are extraordinarily expensive.

From the publication US 2015/364861 A1, for example, an implantable connection system for continuously supplying an implant with a high electrical power is known, in which several plug connectors provided with individual connection cables are connected to individual sockets, which in turn are connected to the actuator unit of the implant via corresponding connection cables. Here, a retention mechanism ensures a mechanical and electrical connection between the plug connector and the socket receptacle.

Various concepts for implantable plug connectors or cable connections are proposed or theorised in the prior art, but given the design challenges associated with implantable devices, many are overly bulky, expensive and too prone to failure. There is therefore a need for an implantable connection cable assembly with a plug connector and a cable strand which ends in the plug connector that is usable with both the increased power and material requirements of ventricular assist devices, incontinence occlusion systems or appetite control systems, is safe to use, corrosion-resistant and has good mechanical properties with reduced material and manufacturing costs. Furthermore, it is desirable that such a plug connector can be realised in a suitably compact manner so that it can be implanted together with an implant at various locations within the body.

BRIEF SUMMARY OF THE INVENTION

It is therefore the object of the present invention to provide an implantable connection cable assembly of the type mentioned at the beginning, which enables a secure electrical and mechanical connection to a drive assembly of the actuator unit of an implant, can be manufactured at low cost and can be implanted without problems.

This object is achieved in that the at least two contact elements of the plug connector can each have a cable receptacle for electrical connection to the connection cable of the cable strand and a separate connection interface for electrical connection to the drive assembly of the actuator unit, wherein the cavities between the plug housing, the contact elements and the cable strand are filled with a potting compound.

The implant is in particular a cardiac support system, an incontinence occlusion system or an appetite control system The appetite control system is preferably located in the stomach or intestinal tract.

The implantable connection cable assembly according to the invention can be very easily connected to an drive assembly to provide an electrical connection for a powerful and safe power supply to the actuator unit. In this case, the connection cable assembly with the plug connector and the cable strand which ends in the plug connector is positioned releasably to the drive assembly during the installation of the drive assembly and is only non-releasably connected to an actuator unit in a final method step in order to be able to be implanted in a body as part of the implantable medical device. Thus, both the connection cable assembly and a drive assembly with electric motor of the actuator unit can be manufactured separately, wherein, in particular, no connection cables and contacts need to be taken into account when manufacturing the drive assembly, so that the electrical connection points are not exposed to any mechanical load risks. In contrast to the conventional production of implantable medical devices, various manufacturing steps can be carried out outside of a clean room and the individual assemblies can be checked for fluid tightness and the electrical connection can be bested before they are connected in the final installation. If faults are found, both the implantable connection cable assembly and a drive assembly of the actuator unit can be exchanged and replaced before final installation. In addition to the low reject rate due to the avoidance of manufacturing risks, this also reduces the costs for the remaining rejects. The cable strand comprises at least two connection cables, preferably at least three connection cables, which can each be assigned at their ends to a cable receptacle of the at least two contact elements, preferably at least three contact elements, and can be soldered thereto for a good electrical connection. The cable receptacle can have a cable socket for contacting the connection cables emerging from the end of the cable strand. The contact elements consist directly of a material with good electrical conductivity or are provided with a coating with good conductivity. The plug housing of the plug connector has a cable opening for the passage of the cable strand into the plug connector, wherein the cable sheath of the cable strand, which is preferably made of silicone or of a urethane-based thermoplastic elastomer (TPU), only releases the at least two connection cables within the plug housing and enables connecting the connection cables to the contact elements. In the process, the cavities that are created inside the plug housing between the cable opening for the cable strand and the contact elements that are open towards the drive unit are filled with a potting compound that hermetically encloses the end of the cable strand that is inserted through the cable opening in the plug housing and the at least two connection cables.

A particular embodiment provides that an electrically insulating receptacle is provided in which the contact elements are fixed, the electrically insulating receptacle being received in the plug housing. The electrically insulating receptacle allows a secure positioning of the contact elements relative to the plug housing and a good demarcation from the filled cavities that are created inside the plug housing between the electrically insulating receptacle with the contact elements and the cable opening for the cable strand. The contact elements can be anchored in the electrically insulating receptacle by gluing, press-fitting, thermal joining or a combination of different joining methods.

A further embodiment provides that the electrically insulating receptacle has a bore, preferably a substantially centrally arranged bore, wherein the potting compound for filling the cavities is introduced into the plug housing through the bore. During the installation of the connection cable assembly, the electrically insulating receptacle is positioned in a connection opening of the plug housing and, in order to seal and fix the at least two connection cables as well as the end of the cable strand in the cable opening, is filled with a potting compound in order to fix the electrically insulating receptacle with the at least two contact elements in the plug housing and to seal the connection cables and the end of the cable strand. A central bore in the electrically insulating receptacle facilitates the filling of the cavities with the potting compound. The bore is a through-hole between the side of the electrically insulating receptacle open to the environment and the cavities in the plug housing. To reduce the surface area of the plug connector, the bore of the electrically insulating receptacle can also be filled with potting compound after the cavities of the plug housing have been filled with the potting compound. The central bore in the electrically insulating receptacle facilitates the manufacturing of the plug connector and the filling of the cavities with the potting compound.

Advantageously, the potting compound may be a biocompatible silicone potting compound and/or a biocompatible epoxy resin potting compound, the potting compound preferably comprising at least two regions of different viscosity, at least one region comprising a low viscosity potting compound and at least one region comprising a viscous potting compound.

Both the biocompatible silicone potting compound and the biocompatible epoxy resin potting compound enable a non-toxic, non-reactive and gas- and liquid-impermeable sealing of the plug connector and the cable strand which ends in the plug housing. For secure fixing of the connection cables in the cavity of the plug housing and elastic connection of the cable strand to the plug housing, the potting compound may consist of a biocompatible silicone potting compound in at least one area, preferably in the area of the cable opening, and of a biocompatible epoxy resin potting compound in at least one area.

For a simple configuration of the separate connection interfaces of the at least two contact elements for electrical connection with the drive assembly of the actuator unit, as well as for a flat design of the contact elements, the connection interfaces of the at least two contact elements can be configured as contact sockets for receiving contact pins. These contact sockets can securely receive corresponding contact pins that may protrude from a motor flange of the drive pre-assembly during the installation of connection cable assembly on the drive assembly of the actuator unit.

In order to enable a good electrical connection of the contact sockets with the contact pins of a drive assembly, as well as for a secure hold and a low freedom of movement of the contact pins in the contact sockets, the contact sockets can have a groove for receiving contact pins, in which an electrically conductive, obliquely wound spring is arranged, which forms an electrical contact with the contact pins. Such an obliquely wound spring advantageously enables a redundant, multiple contacting of the contact pins in the contact socket.

Alternatively, flexible spring elements can be used to contact the contact pins in the connection interfaces configured as contact sockets.

Advantageously, the contact elements can be gold-plated for optimized current transmission or made of a corrosion-resistant metal alloy, in particular an alloy with platinum and/or iridium, also in order to avoid a reaction with body fluids in an implanted state of the connection cable assembly and to prevent toxic exposure of the patient.

A useful embodiment provides that the plug housing is made of a weldable, biocompatible metal, preferably a corrosion-resistant, weldable metal. Preferably, the plug housing is made of a titanium alloy, in particular TiAl6V 4. Alternatively, the plug housing can also be made of a weldable, biocompatible plastic. This allows for a non-releasable welded connection with the drive assembly of an implant during the final installation of the connection cable assembly, whereby the two assemblies are tightly and permanently connected to each other.

Thus, the connection cable assembly and the drive assembly of the actuator unit, which are individually hermetically sealed and prevent the ingress of body fluids, can also be hermetically connected to each other externally as complete actuator units.

An alternative embodiment provides that an earthing contact, preferably an obliquely wound spring contact, is provided in the cavity between the cable strand and the plug housing. Such an earthing contact enables an electrically conductive connection between the cable shield of the cable strand and the plug housing, wherein the cable sheath is partially removed at the end of the cable strand and an earthing contact is made with the plug housing, preferably by an obliquely wound annular spring which both rests on the cable shield and is pressed against the plug housing. This allows a simple and safe electrical connection between the cable shield of the cable strand and the plug housing, thus avoiding the provision of an additional earth connection. Alternatively, an additional fourth connection cable can be provided as an earth connection.

In addition to the power supply, further connections can also be provided for the data transmission of sensor signals. Since the installation space for implants usually has to be kept as small as possible, a secondary use of the cable strands, which primarily serve the energy supply/power transmission, would be conceivable through superimposed transmission of sensor signals, as is known, for example, from the "One Cable Technology" (OCT). In addition to the more compact installation space, a reduced number of electrical contacts increases the overall reliability of the electrical connections.

Furthermore, the implantable connection cable assembly may be connectable to a drive assembly with an electric motor to form an actuator unit of an implant, which, in addition to a simple installation of the connection cable assembly and the drive assembly, also enables a secure electrical connection between the two components of the actuator unit of an implant.

Further the present invention relates to an actuator unit of an implant comprising a separately manufactured drive assembly with an electric motor and a separately manufactured implantable connection cable assembly according to any of the embodiments described above, wherein the drive assembly and the implantable connection cable assembly are non-releasably connected to one another, in particular are smoothly and seamlessly laser-welded. In particular, a continuous-wave (CW) laser welding process is used for this purpose. The two assemblies are contacted by connecting the complementary contact elements of the assemblies, usually by inserting contact pins into associated contact sockets, wherein the drive assembly and the implantable connection cable assembly are releasably coupled to each other during installation and are non-releasably connected to each other until the final manufacturing step of the actuator unit. For this purpose, the housings of the two assemblies are welded together by a laser welding process. Thus, various production steps for the separately manufactured assemblies can be carried out in normal ambient areas, the assemblies can be tested and cleaned separately and only the necessary production steps of the final installation can take place under appropriate cleanliness conditions. The implant is in particular a cardiac support system, an incontinence occlusion system or an appetite control system. The appetite control system is preferably located in the stomach or intestinal tract.

In addition, the present invention also relates to a method for manufacturing an actuator assembly of an implant having a drive assembly with an electric motor and an implantable connection cable assembly; the method comprises separately manufacturing the drive assembly, the drive assembly having electrical contacts for electrical connection to the connection cable assembly; separately manufacturing the implantable connection cable assembly with a plug connector and a cable strand which ends with the plug connector, the plug connector having contact elements for electrical connection to the electrical contacts of the drive assembly; releasably connecting the drive assembly and the implantable connection cable assembly during the installation of the actuator unit; and subsequently non-releasably connecting the drive assembly and the implantable connection cable assembly. The releasable connection of the drive assembly and the implantable connection cable assembly during the installation of the actuator unit allows the assemblies to be manufactured separately, whereby the electrical connection points of the drive assembly and the connection cable assembly are exposed to fewer mechanical stress risks, as no connection cables need to be observed during the manufacture of the drive assembly. Furthermore, electrical connection measurements and mechanical tests can be performed prior to the non-releasable connection of the drive assembly to the implantable connection cable assembly, so that only flawless assemblies are fed to the subsequent manufacturing step of the actuator unit to reduce scrap and cost of rejected components. The implant is in particular a cardiac support system, an incontinence occlusion system or an appetite control system. The appetite control system is preferably located in the stomach or intestinal tract.

A favourable variant of the method for manufacturing an actuator unit provides that the separately manufactured drive assembly and the separately manufactured implantable connection cable assembly are hermetically sealed against liquids and gases. The non-releasable connection of the assemblies in the subsequent manufacturing step of the actuator unit, in combination with the drive and connection cable assemblies already hermetically sealed against liquids and gases, enables an increased protection of the actuator unit against the ingress of liquids and gases via the double hermetic seal. The subsequent non-releasable connection is preferably done by welding and in particular by continuous-wave laser welding.

Furthermore, separately manufacturing the implantable connection cable assembly comprises filling the cavities of the plug connector between a plug housing, the cable strand, the connection cables emerging from the cable strand and the contact elements of the plug connector connected to the connection cables with a potting compound, in particular with a biocompatible silicone potting compound and/or a biocompatible epoxy resin potting compound. Filling the existing cavities in the plug housing of the plug connector with a potting compound enables a good seal and fixation of the cable strand, as well as the avoidance of any air pockets. Advantageously, a biocompatible silicone potting compound and/or a biocompatible epoxy resin potting compound are used, which enable a non-toxic, biocompatible, non-reactive and gas- and liquid-impermeable sealing of the plug connector and the cable strand which ends in the plug housing. For secure fixing of the connection cables in the cavity of the plug housing and elastic connection of the cable strand to the plug housing, the potting compound preferably comprises at least two regions of different viscosity, at least one region comprising a low viscosity potting compound and at least one region comprising a viscous potting compound.

A useful variant of the method provides that the non-releasable connection of the drive assembly and the implantable connection cable assembly is carried out in a final manufacturing step of the actuator unit, in particular by welding and preferably by continuous-wave laser welding. Welding the separately manufactured drive assembly to the separately manufactured implantable connection cable assembly in the subsequent manufacturing step of the actuator unit enables a tight and permanent connection of the assemblies, as well as an actuator unit that is hermetically sealed from the outside, so that penetration of body fluids into the actuator unit of the implant is reliably prevented.

BRIEF DESCRIPTION OF THE SEVERAL VIEWS OF THE DRAWINGS

In the following, a particular embodiment of the connection is explained in more detail with the aid of exemplary drawings.

DETAILED DESCRIPTION OF THE INVENTION

Figure 1:
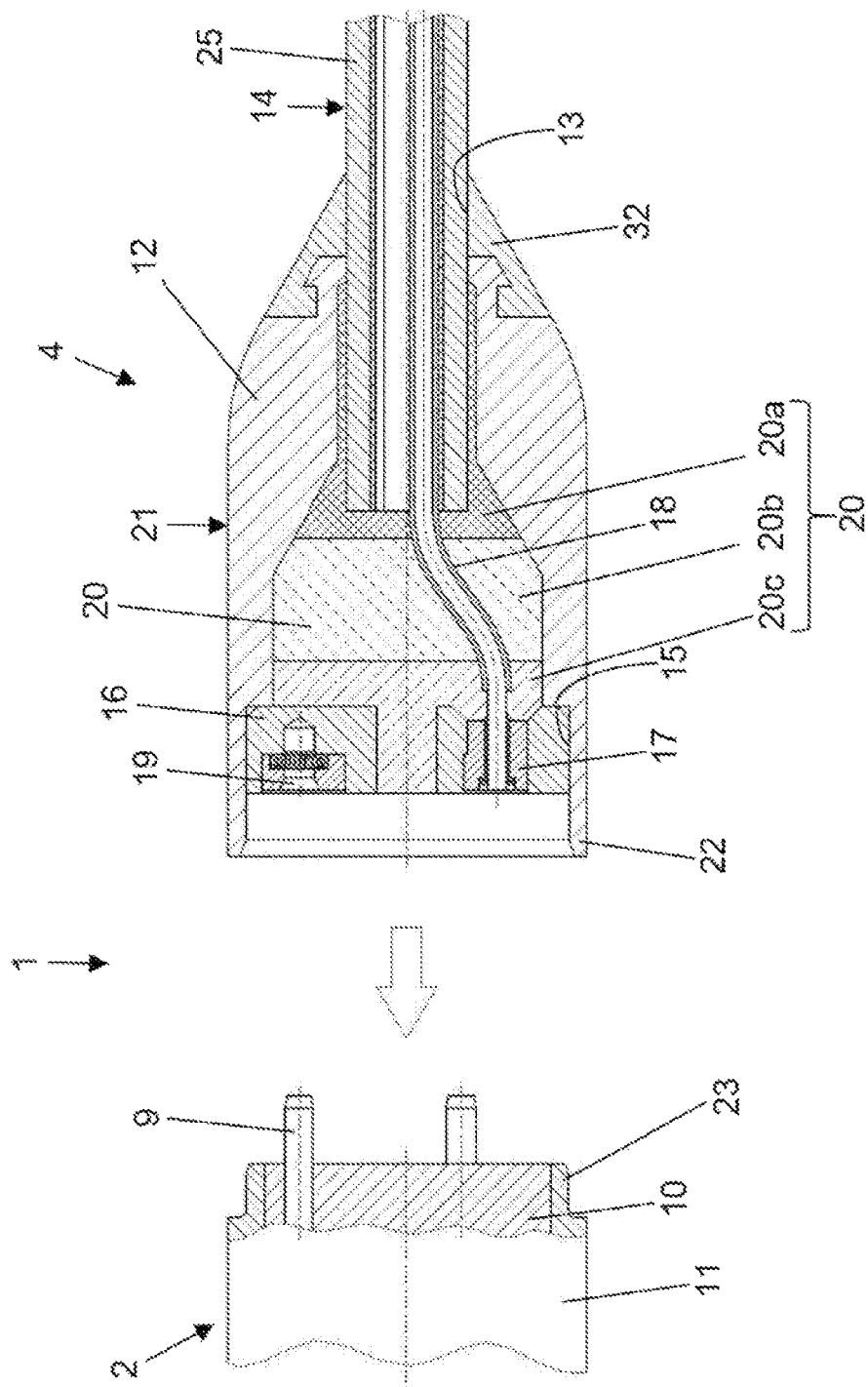
FIG. 1 shows a sectional side view of a drive assembly and an implantable connection cable assembly of an actuator unit of an implant according to the invention.

The actuator unit 1 of an implant shown in FIG. 1 has a drive assembly 2 with an electric motor, as well as an implantable connection cable assembly 4 according to the invention. The electric motor (not shown) of the drive assembly 2 preferably has, in addition to the motor shaft which is supported by a motor bearing, also a motor circuit board for controlling and supplying voltage to the windings of the electric motor, a journal being provided in the center of the motor circuit board for guiding the motor shaft. The electric motor is provided with a stator winding, which is preferably electrically connected to the motor circuit board and wired via the motor circuit board. The stator windings are electrically supplied via contact pins 9, which are also electrically connected to the motor circuit board. The contact pins 9 can be firmly arranged on a motor circuit board. The free ends of the contact pins 9 project axially from the motor housing 11 of the drive assembly 2, which is hermetically sealed with a potting compound 10, in particular an epoxy resin potting compound, and enable electrical connection of the motor circuit board to the connection cable assembly 4. Alternatively, a multipin feedthrough, which on the periphery or at the front is made of the same material as the motor housing and is welded to it, could be used here. A ceramic material could serve as a tight insulation. The use of a motor circuit board would not be mandatory with this alternative configuration.

Figure 3:
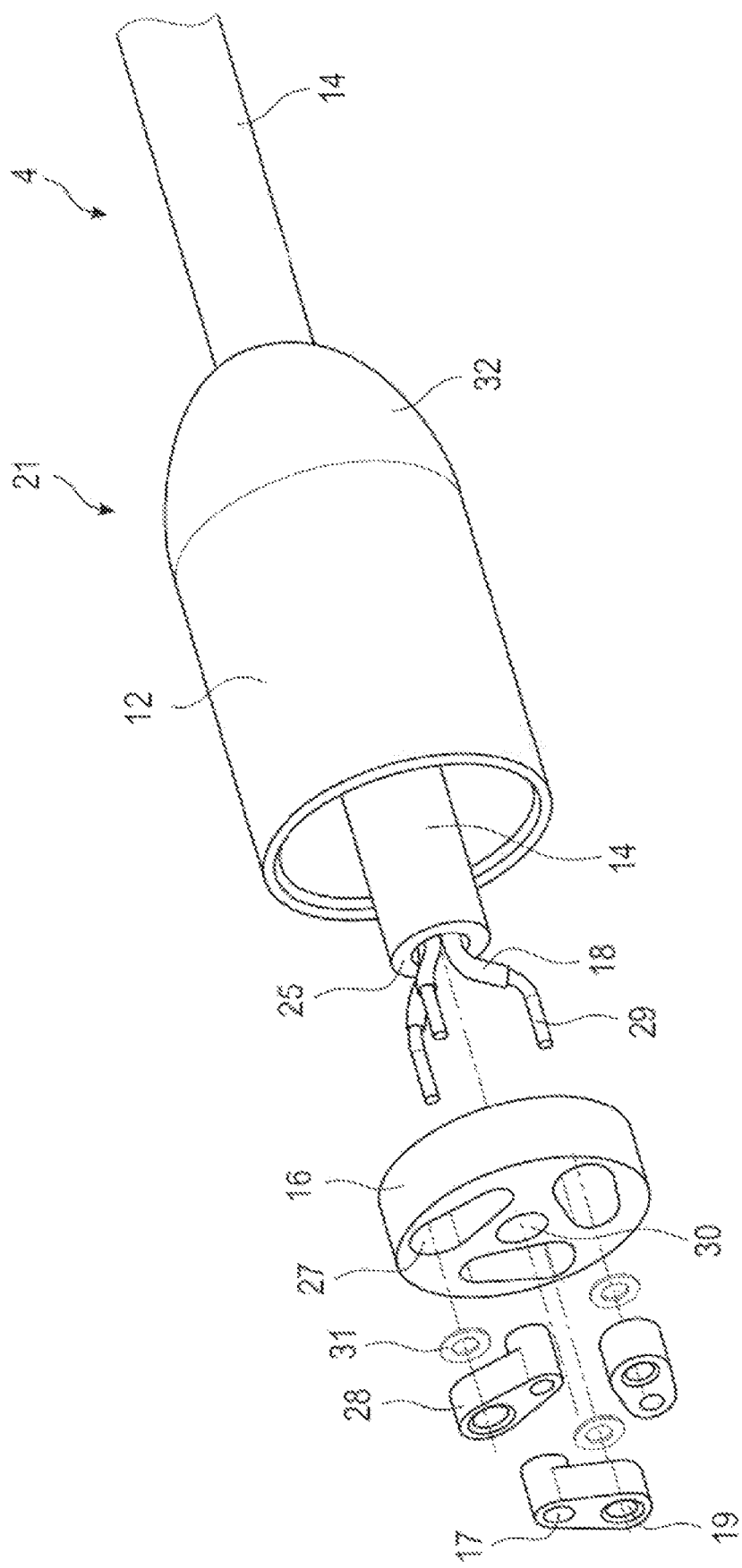
FIG. 3 shows an exploded perspective view of the connection cable assembly according to the invention.

The connection cable assembly 4 comprises a plug housing 12 in which the end of a cable strand 14 projects through a cable opening 13 and an electrically insulating receptacle 16 arranged in the opposite connection opening 15 with corresponding cable receptacles. The cable receptacles have cable sockets 17 for contacting the connection cables 18 emerging from the end of the cable strand 14. Optionally, crimp sleeves can be attached to the connection cables. Furthermore, the insulating receptacle 16 houses contact sockets 19 that allow electrical contact with the ends of the contact pins 9 of the drive assembly 2. The cable sockets 17 and the contact sockets 19 are preferably part of a one-piece electrical contact element 28 as shown in FIG. 3. The cavities in the plug housing 12, between the end of the cable strand 14 and the electrically insulating receptacle 16, are filled with a potting compound 20 to hermetically seal the plug connector 21 of the connection cable assembly 4 so that no cleaning, rinsing or body fluids, as well as no undesirable gases, such as occur during ethylene oxide sterilisation (EtO sterilisation), can penetrate later with a damaging effect, Cleaning, rinsing or bodily fluids, as well as no undesirable gases, such as occur during ethylene oxide sterilisation (EtO sterilisation), can penetrate, which can then later escape with a delayed harmful effect and penetrate into the connection cable assembly 4. The potting compound 20 preferably comprises three potting compound layers 20*a*, 20*b* and 20*c*. The potting compound layers 20*a* and/or 20*b* are preferably made of a viscous potting compound so that they do not "leak" during installation of the connection cable assembly 4, while the potting compound layer 20*c* is preferably made of a low-viscosity, highly fluid potting compound. By means of the potting compound layer 20*c*, cavities between the twisted individual conductors of the cable ends and the insulation can be sealed. For this purpose, it is essential that the bare cable ends of the connection cables 18 are disposed completely in the potting compound layer 20*c*. A connection flange 22 is provided in the connection opening 15 of the plug housing 12 between the electrically insulating receptacle 16 and the end of the plug housing 12, which mates with a corresponding connection stage 23 in the motor housing 11 to allow electrical contacting of the contact pins 9 projecting from the motor housing 11 at the end of the connection stage 23 with the contact sockets 19 of the connection cable assembly 4. This enables a releasable electrical connection between the drive assembly 2 and the connection cable assembly 4 during installation of the actuator unit 1, so that in addition to the individual functions of the drive assembly 2 and the connection cable assembly 4, a safe function of the assemblies within the actuator unit 1 can also be tested and ensured before a final non-releasable connection of the assemblies to each other. This allows both the drive assembly 2 and the connection cable assembly 4 to be manufactured separately, eliminating the need to take into account connection cables 18 when manufacturing the drive assembly 2. In addition to protecting the electrical contacts in the drive assembly 2, this also reduces the mechanical load risks at the electrical connection points of the drive assembly 2. Furthermore, the separate manufacturing of the drive assembly 2 and the connection cable assembly 4 makes it possible to carry out various manufacturing steps outside of clean rooms for the aseptic production of implants and to check function and tightness of the drive assembly 2 and the connection cable assembly 4 separately before the final method step of the non-releasable connection.

Figure 2:
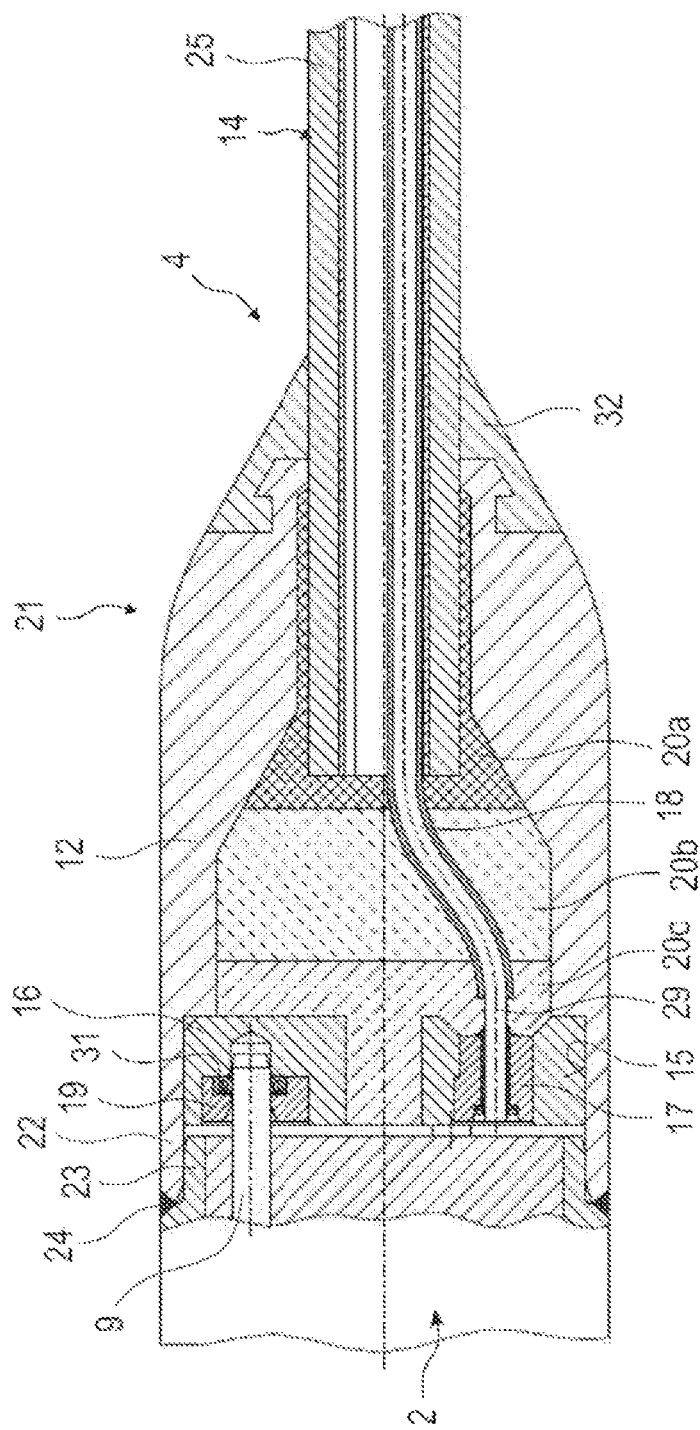
FIG. 2 shows a sectional side view of the non-releasably connected actuator unit from FIG. 1.

The sectional side view in FIG. 2 shows the non-releasably connected drive assembly 2 and connection cable assembly 4 of the actuator unit 1 of an implant. The assemblies 2, 4 of the actuator unit 1 shown in FIG. 1 in an installation state separate from one another are here connected to one another, the contact pins 9 projecting axially from the motor housing 11 of the drive assembly 2 projecting into the contact sockets 19 of the electrically insulating receptacle 16 of the connection cable assembly 4 and being electrically connected. The connection flange 22 of the connection opening 15 of the connection cable assembly 4 completely covers the connection stage 23 of the drive assembly 2. In the contact area of the motor housing 11 of the drive assembly 2 and the plug housing 12 of the plug connector 21, the motor housing 11 and the plug housing 12 are welded together, preferably by a continuous-wave laser welding process, to achieve a smooth, seamless connection. The weld 24 between the motor housing 11 and the plug housing 12 extends continuously around the circumference of the actuator unit 1 and, in addition to providing an inseparable connection between the drive assembly 2 and the connection cable assembly 4, provides an additional hermetic seal against body fluids to which the actuator unit 1 of an implant is exposed in a patient's body.

The exploded view of the connection cable assembly 4 in FIG. 3 shows not only the structure of the plug connector 21 but also its installation. The cable strand 14 extends through the cable opening 13 at the narrow end of the plug housing 12 into the plug housing 12 and exposes at its projecting end the connection cables 18 which project from the cable sheath 25 of the cable strand 14. The connection cables 18 are provided with bare cable ends 29 or alternatively crimp sleeves applied to the cable ends, which extend through the electrically insulating receptacle 16 and the recess 27 for the contact elements 28 into the cable sockets 17 of the contact elements 28, where they are electrically connected to the cable sockets 17. The contact sockets 19 have an internal groove (not shown) in which an electrically conductive, obliquely wound spring 31 is inserted to create a secure electrical contact to the contact pins 9. The cable sockets 17 and the contact sockets 19 are preferably part of the electrical contact element 28 and are made in one piece with it. At least in the area of current transmission, the contact socket 19 is preferably made of a coating which may be multi-layered and whose outermost layer consists of gold. Furthermore, the contact socket 19 is configured in such a way that the angularly wound spring 31 is radially and axially preloaded.

For ensuring that the angularly wound spring 31 can be easily inserted into the contact socket 19 and does not have to be pressed into the groove with high effort, the optimum groove width for the axially preloaded state of the angularly wound spring 31 is only created when the contact element 28 with the contact socket 19 is firmly connected flush with the surface of the electrically insulating receptacle 16. The contact elements 28 are firmly anchored in the recesses 27 of the electrically insulating receptacle 16, for example by gluing, press-fitting, thermal joining or another joining method or a combination of different joining methods. In the assembled state of the connector cable assembly 4, the cavities created within the connector housing 12 are filled with a potting compound 20 for sealing and fixing the cable harness 14 and the connector cables 18. In this case, the potting compound 20 can be introduced into the cavities in the plug connector 21 through a central bore 30 in the electrically insulating receptacle 16. Finally, the bore 30 in the electrically insulating receptacle 16 is also filled with the potting compound 20 to achieve the best possible seal and a low surface area of the connection cable assembly 4.

Figure 4:
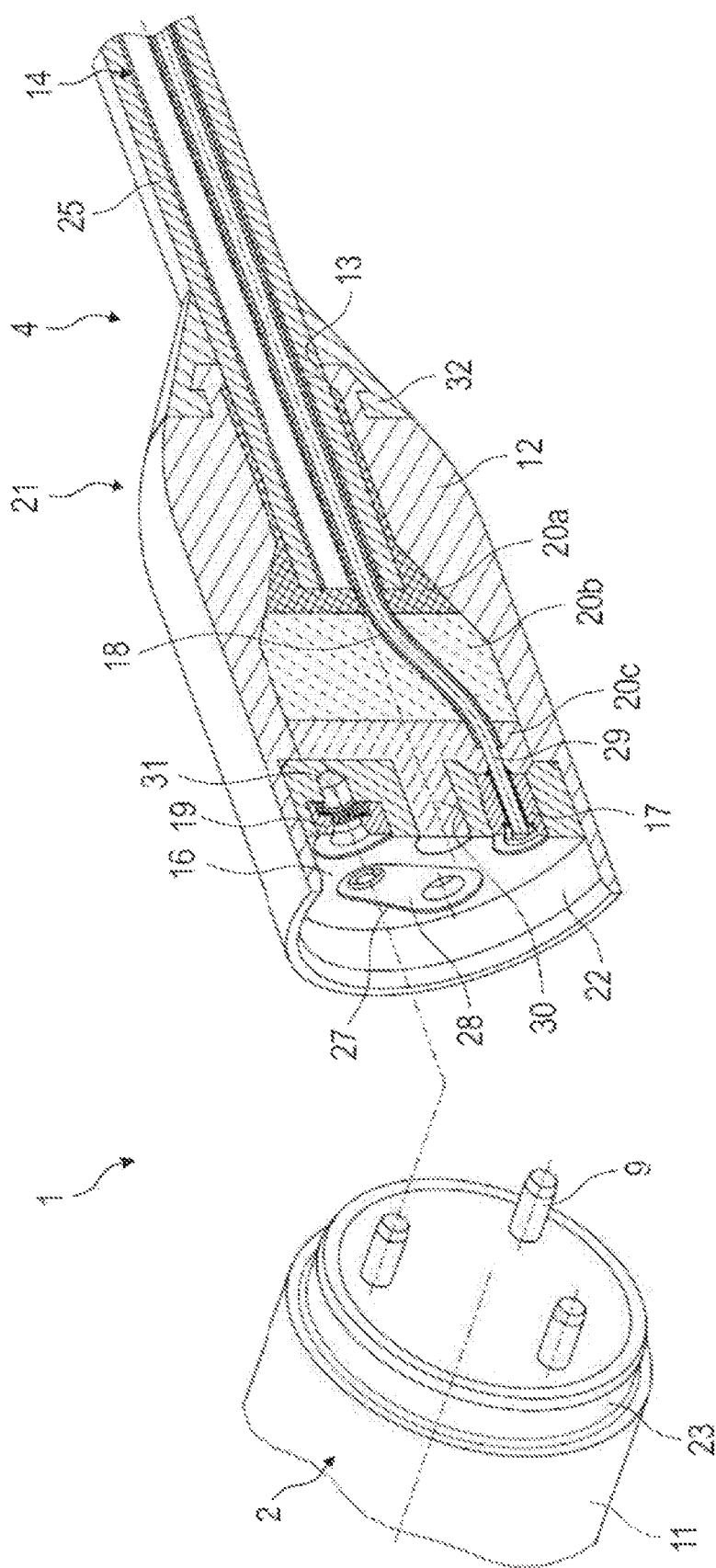
FIG. 4 shows a partial sectional perspective view of the not connected actuator unit from FIG. 1.

FIG. 4 shows a perspective, partial sectional view of the drive assembly 2 and connection cable assembly 4 of the actuator unit 1 from FIG. 1, which are still separated from each other. On the drive assembly 2, in addition to the motor housing 11 and the connection stage 23, the protruding contact ends of the contact pins 9, which are encapsulated with a potting compound 10, can also be seen. On the connection cable assembly 4, in addition to the connection flange 22 in the plug housing 12 of the plug connector 21, the contact elements 28 arranged in the recesses 27 of the electrically insulating receptacle 16 with the cable ends 29 of the connection cables 18 electrically connected in the cable sockets 17, as well as the contact sockets 19, which are preferably a one-piece component of the contact elements 28, with the spring 31 arranged in the groove, can be seen very clearly. An end cap 32 is provided at the end of the cable opening 13 of the plug housing 12, which is preferably made of a resilient material and forms a good seal against the cable sheath 25 of the cable strand 14.

Alternatively, the end cap can also be configured as a cable overmoulding or cable potting in order to ensure a clean, seamless and flow-optimized transition from the metallic plug housing 12 to the cable sheath 25, which also results in a certain strain relief and bend protection.

The sectional view of the connection cable assembly 4 in FIG. 4 shows furthermore that different potting compounds 20a, 20b and 20c have been used for filling the cavities in the plug housing 12, preferably biocompatible silicone potting compounds and/or epoxy resin potting compounds. For a better filling of the gap to the cable sheath 25, before inserting the electrically insulating receptacle 16 into the connection opening 15 of the plug housing 12, a part of the potting compound 20, preferably a biocompatible silicone or epoxy resin potting compound, is introduced into the plug housing 12, so that when the insulating receptacle 16 is inserted into the connection opening 15, the potting compound layer 20a is pressed into the narrow, circular gap around the cable sheath 25. A middle layer of potting compound 20b is then introduced into the cavity in the plug housing 12 through the bore 30 in the insulating receptacle 16, which flows around the connection cables 18, while a third layer of potting compound 20c is subsequently introduced into the upper part of the cavity in the plug housing 12 through the bore 30, which insulates the bare cable ends 29, tightly seals a potential opening between twisted individual conductors and the cable insulation, and securely fixes the electrically insulating receptacle 16 in the connection opening 15. The potting compound layers 20a and/or 20b are preferably made of a viscous potting compound so that they do not "leak" during installation of the connection cable assembly 4, while the potting compound layer 20c is preferably made of a low-viscosity, highly fluid potting compound.

The structure and mode of operation of the various potting compound layers 20a, 20b, 20c can once again be seen very clearly in the partial sectional view of the actuator unit 1 from FIG. 2. It can be seen that the upper layer of the potting compound 20c in the area of the bare cable ends 29 between the connection cables 18 and the cable sockets 17 enables the electrically insulating receptacle 16 to be securely fixed in the connection opening 15 of the plug housing 12. Furthermore, the connection flange 22 formed on the plug housing 12 of the connection cable assembly 4 and the connection stage 23 of the motor housing 11 of the drive assembly 2 can also be clearly seen in this illustration.

Figure 5:
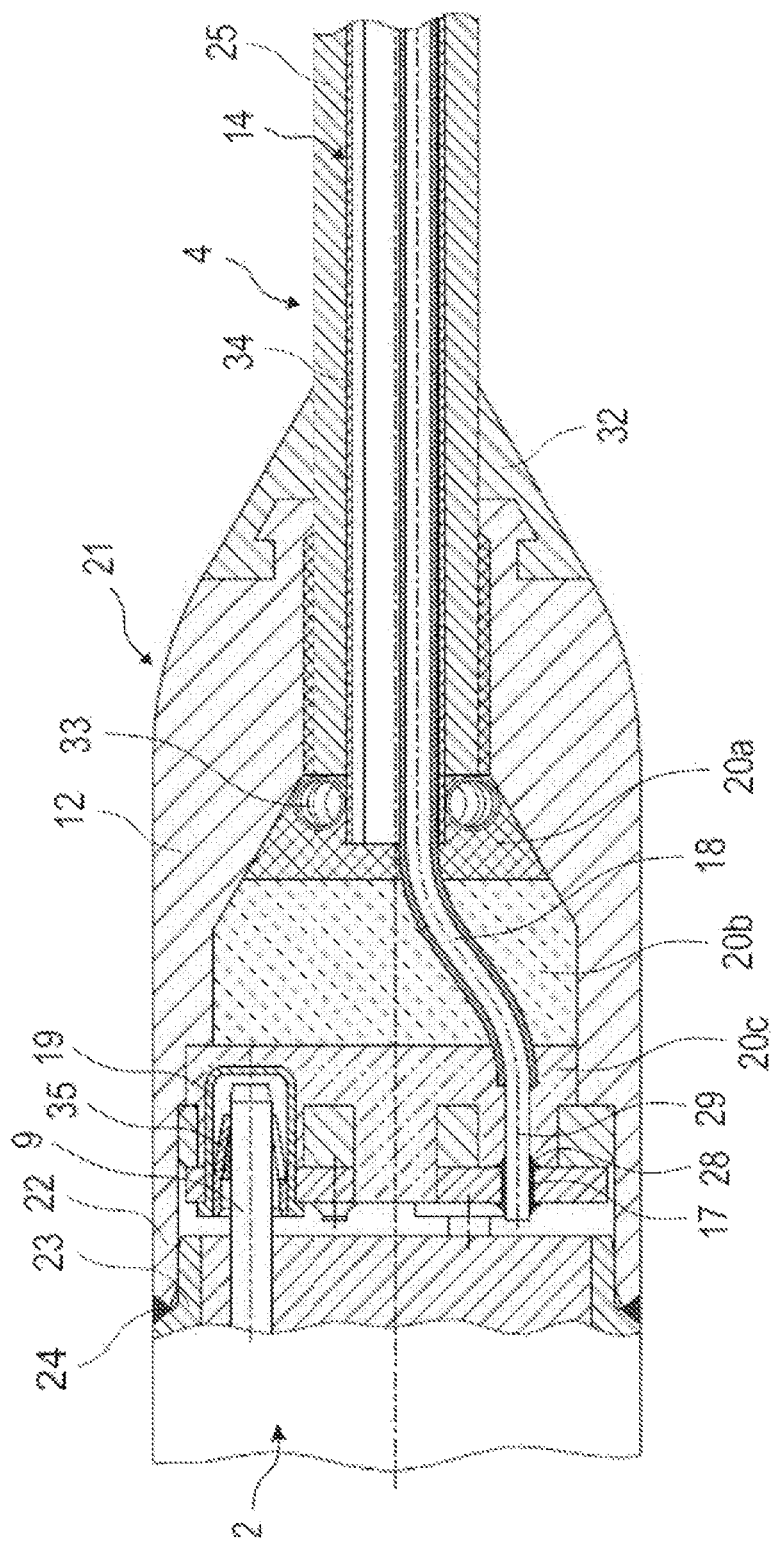
FIG. 5 shows a sectional detail view of a further embodiment of the implantable connection cable assembly for an actuator unit according to FIG. 2.

FIG. 5 shows a further embodiment of the implantable connection cable assembly 4 for an actuator unit 1 of FIG. 2 and, in contrast to the embodiment shown previously, here the cable sheath 25 is removed at the end of the cable strand 14 within the plug housing 12 and an electrical connection is provided between the cable shield 34 and the electrically conductive plug housing 12 of the plug connector 21 by means of an additional obliquely wound electrically conductive spring 33. In a preferred embodiment, the spring 33 may be axially preloaded. The electrically conductive connection between the cable shield 34 and the plug housing 12 by means of the obliquely wound spring 33 makes it possible to dispense with an additional earth connection or an additional earthing cable between the cable shield 34 of the cable strand 14 and the plug housing 12. Furthermore, the contact elements 28 between the cable sockets 17 and the contact sockets 19 are applied directly to the back of the electrically insulating receptacle 16 and are configured as an electrical circuit board, and are electrically insulated by the upper layer of the potting compound 20c. The contact between the contact pins 9 projecting from the drive assembly 2 and the contact socket 19 is provided here alternatively by flexible finger elements 35. However, contacting by means of an obliquely wound spring, as shown in FIGS. 1 to 4, is also possible here.

REFERENCE SIGNS LIST

1 Actuator unit
2 Drive assembly
4 Connection cable assembly
9 Contact pins
10 Potting compound
11 Motor housing
12 Plug housing
13 Cable opening
14 Cable strand
15 Connection opening
16 Insulating receptacle
17 Cable sockets
18 Connection cable
19 Contact sockets
20 Potting compound
20a Potting compound layer
20b Potting compound layer
20c Potting compound layer
21 Connector
22 Connection flange
23 Connection stage
24 Weld
25 Cable sheath
27 Recess
28 Contact elements
29 Cable ends
30 Bore
31 Spring
32 End cap
33 Spring
34 Cable shield
35 Flexible finger elements
23 Connection stage
24 Weld
25 Cable sheath
27 Recess
28 Contact elements
29 Cable ends
30 Bore
31 Spring
32 End cap
33 Spring
34 Cable shield
35 Flexible finger element

The invention claimed is:

1. An implantable connection cable assembly for an actuator unit of an implant comprising:
a plug connector and a cable strand which ends in the plug connector and has at least two connection cables, wherein the plug connector has a plug housing and at least two contact elements each connected to a connection cable, wherein the contact elements are fixed in the plug housing; and
wherein the at least two contact elements of the plug connector each have a cable receptacle configured for electrical connection to a respective connection cable of the cable strand, and a separate connection interface configured for electrical connection to a drive assembly of the actuator unit, wherein cavities between the plug housing, the contact elements and the cable strand are filled with a potting compound.

2. The implantable connection cable assembly according to claim 1, comprising:
an electrically insulating receptacle, in which the contact elements are fixed, the electrically insulating receptacle being received in the plug housing.

3. The implantable connection cable assembly according to claim 2,
wherein the electrically insulating receptacle has a bore, and wherein the potting compound for filling the cavities is selected for interpretation into the plug housing through the bore.

4. The implantable connection cable assembly according to claim 1, wherein the potting compound is a biocompatible silicone potting compound and/or a biocompatible epoxy resin potting compound, the potting compound comprising:
at least two regions of different viscosity, wherein at least one first region of the at least two regions including a low viscosity potting compound and at least one second region of the at least two regions including a viscous potting compound.

5. The implantable connection cable assembly according to claim 1, wherein the separate connection interfaces of the at least two contact elements are configured as contact sockets for receiving contact pins.

6. The implantable connection cable assembly according to claim 5, wherein the contact sockets for receiving the contact pins comprise:
 a groove in which an electrically conductive, obliquely wound spring is arranged to form an electrical contact with the contact pins.

7. The implantable connection cable assembly according to claim 1, wherein the contact elements are gold-plated or formed by a corrosion-resistant metal alloy.

8. The implantable connection cable assembly according to claim 1, wherein the plug housing is formed by a weldable biocompatible metal, and/or a corrosion-resistant weldable metal.

9. The implantable connection cable assembly according to claim 1, wherein an earthing contact is provided in the cavity between the cable strand and the plug housing.

10. The implantable connection cable assembly according to claim 1, wherein the implantable connection cable assembly is configured to be connectable to a drive assembly with an electric motor to the actuator unit of an implant.

11. An actuator unit of the implant comprising:
 a separately manufactured drive assembly with an electric motor and a separately manufactured implantable connection cable assembly according to claim 1, wherein the drive assembly and the implantable connection cable assembly are non-releasably connected to one another.

12. The implantable connection cable assembly according to claim 3, wherein the bore is centrally arranged.

13. A method for manufacturing an actuator unit of an implant having a drive assembly with an electric motor and an implantable connection cable assembly, the method comprising:
 separately manufacturing the drive assembly, the drive assembly having electrical contacts configured for electrical connection to the implantable connection cable assembly;
 separately manufacturing the implantable connection cable assembly with a plug connector and a cable strand which ends in the plug connector, the plug connector having contact elements configured for electrical connection to the electrical contacts of the drive assembly;
 releasably connecting the drive assembly and the implantable connection cable assembly during installation of the actuator unit; and
 subsequently non-releasably connecting the drive assembly and the implantable connection cable assembly.

14. The method for manufacturing the actuator unit of the implant according to claim 13, wherein the separately manufactured drive assembly and the separately manufactured implantable connection cable assembly are hermetically sealed against liquids and gases.

15. The method for manufacturing the actuator unit of the implant according to claim 14, wherein separately manufacturing the implantable connection cable assembly comprises:
 filling cavities of the plug connector between a plug housing, the cable strand, the connection cables emerging from the cable strand and the contact elements of the plug connector connected to the connection cables with a potting compound, which is a biocompatible silicone potting compound and/or a biocompatible epoxy resin potting compound.

16. The method for manufacturing the actuator unit of the implant according to claim 13, comprising:
 non-releasably connecting the drive assembly and the implantable connection cable assembly in a final manufacturing step of the actuator unit, by welding and and/or by continuous-wave laser welding.

17. The implantable connection cable assembly according to claim 9, wherein the earthing contact is an obliquely wound spring contact.

18. The actuator unit according to claim 11, wherein the drive assembly and the implantable connection cable assembly are connected by a laser weld.

\* \* \* \* \*